United States Patent
Sasaki et al.

(10) Patent No.: US 8,242,184 B2
(45) Date of Patent: Aug. 14, 2012

(54) PROCESS FOR PRODUCING FLEXIBLE POLYURETHANE FOAM

(75) Inventors: Takayuki Sasaki, Kamisu (JP); Daisuke Kaku, Kamisu (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/719,930

(22) Filed: Mar. 9, 2010

(65) Prior Publication Data

US 2010/0168262 A1 Jul. 1, 2010

Related U.S. Application Data

(63) Continuation of application No. PCT/JP2008/066601, filed on Sep. 12, 2008.

(30) Foreign Application Priority Data

Sep. 18, 2007 (JP) .................................. 2007-241372

(51) Int. Cl.
C08G 18/28 (2006.01)

(52) U.S. Cl. ........ 521/174; 521/110; 521/112; 521/125; 521/127; 521/128; 521/129; 521/130; 521/137; 521/170

(58) Field of Classification Search .................. 521/125, 521/127, 128, 129, 130, 170, 174, 110, 112, 521/137

See application file for complete search history.

(56) References Cited

U.S. PATENT DOCUMENTS

| | | | |
|---|---|---|---|
| 5,093,380 A | 3/1992 | Takeyasu et al. | |
| 5,648,559 A | 7/1997 | Hager | |
| 5,874,485 A * | 2/1999 | Milliren et al. | 521/160 |
| 6,313,060 B1 | 11/2001 | Sugiyama et al. | |
| 6,391,935 B1 * | 5/2002 | Hager et al. | 521/170 |
| 6,491,846 B1 * | 12/2002 | Reese et al. | 252/182.27 |
| 6,653,362 B2 | 11/2003 | Toyota et al. | |
| 6,734,219 B2 | 5/2004 | Wada et al. | |
| 6,756,415 B2 | 6/2004 | Kimura et al. | |
| 6,759,448 B2 | 7/2004 | Toyota et al. | |
| 6,815,467 B2 | 11/2004 | Toyota et al. | |
| 6,921,737 B1 * | 7/2005 | Dexheimer et al. | 502/175 |
| 7,388,036 B2 | 6/2008 | Sasaki et al. | |
| 7,388,037 B2 | 6/2008 | Sasaki et al. | |
| 7,588,121 B2 | 9/2009 | Sasaki et al. | |
| 7,635,724 B2 | 12/2009 | Sasaki et al. | |
| 2004/0152797 A1 | 8/2004 | Wada et al. | |
| 2004/0229970 A1 | 11/2004 | Sasaki et al. | |
| 2004/0266897 A1 * | 12/2004 | Apichatachutapan et al. | 521/131 |
| 2005/0038133 A1 * | 2/2005 | Neff et al. | 521/155 |
| 2006/0160913 A1 | 7/2006 | Sasaki et al. | |
| 2007/0213420 A1 | 9/2007 | Kimura et al. | |
| 2007/0219284 A1 | 9/2007 | Sasaki et al. | |
| 2008/0081847 A1 | 4/2008 | Sasaki et al. | |
| 2008/0085945 A1 | 4/2008 | Sasaki et al. | |
| 2008/0114088 A1 | 5/2008 | Sasaki et al. | |
| 2008/0176970 A1 | 7/2008 | Sasaki et al. | |
| 2009/0062416 A1 | 3/2009 | Sasaki et al. | |
| 2009/0215918 A1 | 8/2009 | Sasaki et al. | |

FOREIGN PATENT DOCUMENTS

| | | |
|---|---|---|
| JP | 08-231676 | 9/1996 |
| JP | 08-231677 | 9/1996 |
| JP | 09-031153 | 2/1997 |
| JP | 09-124763 | 5/1997 |
| JP | 09-176272 | 7/1997 |
| JP | 2000-517347 | 12/2000 |
| JP | 2001-200028 | 7/2001 |
| JP | 2005-301000 | 10/2005 |
| WO | 2006-054657 | 5/2006 |

OTHER PUBLICATIONS

U.S. Appl. No. 12/732,778, filed Mar. 26, 2010, Sasaki, et al.
Office Action issued Feb. 13, 2012, Chinese Patent Application No. 200880107202.9, filed Sep. 12, 2008 (with English translation).
Yu, W., "The assistants for polyurethane elastomer", Symposium of eleventh annual conference of Polyurethane Industry Association, pp. 79-82 (2002).
Liang, S., "The research on the relation of the foam structure and mechanics character", Data of Papers of Doctor and Master, p. 32 (Dec. 15, 2005).

* cited by examiner

Primary Examiner — John Cooney
(74) Attorney, Agent, or Firm — Oblon, Spivak, McClelland, Maier & Neustadt, L.L.P.

(57) ABSTRACT

To provide a process for producing a flexible polyurethane foam, which comprises reacting a polyol compound and a polyisocyanate compound in an open system substantially without using a silicone foam stabilizer.
A process for producing a flexible polyurethane foam, which comprises reacting a polyol composition (I) containing at least a polyol compound and containing at least one of a polyol compound (A) and a monool compound (X) obtained by ring-opening polymerization of an alkylene oxide with an initiator by using a double metal cyanide complex catalyst, and a polyisocyanate composition (II) in the presence of a urethane-forming catalyst made of a metal catalyst and an amine catalyst, and a blowing agent, in an open system substantially without using a silicone foam stabilizer.

14 Claims, No Drawings

PROCESS FOR PRODUCING FLEXIBLE POLYURETHANE FOAM

TECHNICAL FIELD

The present invention relates to a process for producing a flexible polyurethane foam.

BACKGROUND ART

A flexible polyurethane foam is used for various applications, and one obtained by reacting a polyol compound and a polyisocyanate compound in an open system (slab method) and one obtained by reacting them in a closed system (molding method) are known. The flexible polyurethane foam obtained by the reaction in an open system is used, for example, for mattresses, beddings e.g. cushions for a sofa, or furniture. Further, the flexible polyurethane foam obtained by the reaction in a closed system is used, for example, for sheet cushions of a vehicle or sheet back materials.

The reaction of the polyol compound with the polyisocyanate compound is carried out in the presence of a urethane-forming catalyst, a blowing agent and a foam stabilizer, and as the foam stabilizer, a silicone foam stabilizer is widely used. For example, a flexible polyurethane foam using a dimethylpolysiloxane-polyoxyalkylene copolymer as the foam stabilizer is known (Patent Document 1).

However, since the silicone foam stabilizer contains a volatile organic compound (VOC), it may cause e.g. generation of an odor or drawbacks of electronic components. Further, in a case where microbes are supported on the flexible polyurethane foam and used for waste water disposal, a chemical oxygen demand (COD) may be increased by the silicone foam stabilizer. Further, in a production of the flexible polyurethane foam, since the unit price of the silicone foam stabilizer is generally the highest in raw materials, the economical efficiency tends to be low.

For an application for a sound insulting material, as a process for producing a polyurethane foam without using a silicone foam stabilizer, a process of using a polyether polyol having a molecular weight distribution within a range of from 1.02 to 1.2 and having a primary hydroxy group as a terminal group, is disclosed (Patent Document 2). However, since the obtained polyurethane foam has a density of at least 80 kg/m$^3$, cushions properties are lost, and it tends to be hardly applied to mattresses, beddings e.g. cushions for a sofa, or furniture, which are applications of the flexible polyurethane foam obtained by a common reaction in the open system.

In the case of the closed system, as a process for producing the flexible polyurethane foam without using a silicone foam stabilizer, a process of using a polyol compound which is obtained by ring-opening polymerization of propylene oxide with an initiator by using a double metal cyanide complex catalyst (DMC catalyst), and further, ring-opening polymerization of ethylene oxide at its terminals by an alkali metal compound catalyst or a phosphazenium complex, is disclosed (Patent Document 3). However, generally, in the case of a reaction in the closed system, the foaming state is controlled so that the volume of the obtainable flexible polyurethane foam is larger than that of a mold for closing. Therefore, the reaction conditions are different from the case of foaming in the open system, and the conditions in the closed system cannot be applied as they are to the open system.

From the above, a strategy capable of producing a flexible polyurethane foam without using a silicone foam stabilizer in the open system is desired.

Patent Document 1: JP-A-2001-200028
Patent Document 2: JP-A-2005-301000
Patent Document 3: WO2006/054657

DISCLOSURE OF THE INVENTION

Object to be Accomplished by the Invention

The present invention provides a process for producing a flexible polyurethane foam, which comprises reacting a polyol compound and a polyisocyanate compound in an open system substantially without using a silicone foam stabilizer.

Means to Accomplish the Object

The process for producing a flexible polyurethane foam of the present invention comprises reacting a polyol composition (I) containing at least a polyol compound and a polyisocyanate composition (II) containing a polyisocyanate compound in the presence of a urethane-forming catalyst and a blowing agent, in an open system substantially without using a silicone foam stabilizer, wherein the urethane-forming catalyst is made of a metal catalyst and an amine catalyst, and the polyol composition (I) contains a polyol compound (A) obtained by ring-opening polymerization of an alkylene oxide with an initiator by using a double metal cyanide complex catalyst and/or a monool compound (X) obtained by ring-opening polymerization of an alkylene oxide with an initiator by using a double metal cyanide complex catalyst.

Further, in the process for producing a flexible polyurethane foam of the present invention, the polyol compound (A) is preferably a polyether polyol obtained by ring-opening polymerization of an alkylene oxide with an initiator by using a double metal cyanide complex catalyst, and having an average number of hydroxy groups of from 2 to 3 and a hydroxy value of from 10 to 90 mgKOH/g.

Further, in the process for producing a flexible polyurethane foam of the present invention, the monool compound (X) is preferably a polyether monool obtained by ring-opening polymerization of an alkylene oxide with an initiator by using a double metal cyanide complex catalyst, and having a hydroxy value of from 5 to 200 mgKOH/g.

Effects of Invention

According to the process of the present invention, it is possible to produce a flexible polyurethane foam by reacting a polyol compound and a polyisocyanate compound in an open system substantially without using a silicone foam stabilizer.

BEST MODE FOR CARRYING OUT THE INVENTION

The process for producing a flexible polyurethane foam of the present invention is a process of reacting a polyol composition (I) and a polyisocyanate composition (II) in the presence of a urethane-forming catalyst and a blowing agent, in an open system substantially without using a silicone foam stabilizer.

<Polyol Composition (I)>

The polyol composition (I) contains at least a polyol compound, and a polyol compound (A) and/or a monool compound (X).

[Polyol Compound (A)]

The polyol compound (A) is a polyether polyol (a polyoxyalkylene polyol) obtained by ring-opening polymerization of an alkylene oxide (a2) with an initiator (a1) by using a double metal cyanide complex catalyst (hereinafter referred to as a DMC catalyst). Therefore, the polyol compound (A) has a polyoxyalkylene chain obtained by ring-opening polymerization of the alkylene oxide (a2) by the DMC catalyst.

The initiator (a1) is one with which a polyol compound to be used for production of a flexible polyurethane foam is obtained, and preferred is a compound having 2 or 3 active hydrogen atoms in its molecule.

The compound having 2 active hydrogen atoms may, for example, be ethylene glycol, propylene glycol, 1,4-butandiol, diethylene glycol or dipropylene glycol. The compound having 3 active hydrogen atoms may, for example, be glycerin or trimethylol propane.

Further, it is preferred to use a polyether polyol having a high hydroxy value, obtained by ring-opening polymerization of an alkylene oxide, preferably propylene oxide with the above compound. Here, the polyether polyol having a high hydroxy value means a polyether polyol having a molecular weight of from about 200 to 500 per a hydroxy group, i.e. having a hydroxy value of from 110 to 280 mgKOH/g. The initiator (a1) is preferably a polyoxypropylene polyol fulfilling the above conditions.

As the initiator (a1), the above compound may be used alone or in combination of two or more of them.

The alkylene oxide (a2) may, for example, be ethylene oxide, propylene oxide, 1,2-epoxybutane or 2,3-epoxybutane. Among them, preferred is to use only propylene oxide, or to use propylene oxide and ethylene oxide in combination, and more preferred is to use only propylene oxide.

As the polyol compound (A), preferred is to use the polyoxypropylene polyol having only propylene oxide ring-opening polymerized with the initiator (a1) from the viewpoint that the durability of the obtained flexible polyurethane foam in a humid state is improved.

As the DMC catalyst, one disclosed in JP-B-46-27250 may, for example, be used. The specific example may be a complex having zinc hexacyanocobaltate as the main component, and preferred is its ether and/or alcohol complex.

The ether may, for example, be preferably ethylene glycol dimethyl ether (glyme), diethylene glycol dimethyl ether (diglyme), ethylene glycol mono-tert-butyl ether (METB), ethylene glycol mono-tert-pentyl ether (METP), diethylene glycol mono-tert-butyl ether (DETB) or tripropylene glycol monomethyl ether (TPME).

The alcohol may be preferably e.g. tert-butyl alcohol.

The DMC catalyst is preferably a zinc hexacyanocobaltate-tert-butyl alcohol complex, a zinc hexacyanocobaltate-ethylene glycol dimethyl ether complex or a zinc hexacyanocobaltate-diethylene glycol mono-tert-butyl ether complex, from the viewpoint of high effect to suppress the cell coarsening and foam shrinkage of the obtained flexible polyurethane foam.

The polyol compound produced by the DMC catalyst is a polyol compound having a narrower molecular weight distribution than that of a polyol compound produced by other catalyst. The polyol compound having a narrower molecular weight distribution has a low viscosity as compared with a polyol having a wide molecular weight distribution in a similar molecular weight range (polyol having the same hydroxy value). Therefore, the polyol compound (A) is excellent in mixing properties with other raw materials at the time of a urethane-forming reaction and has high foam stability at the time of the production of the flexible polyurethane foam.

The amount of the DMC catalyst is preferably from 0.001 to 0.1 part by mass, more preferably from 0.003 to 0.03 part by mass, per 100 parts by mass of the total mass of the initiator (a1) and the alkylene oxide (a2).

By adjusting the amount of the DMC catalyst to from 0.001 to 0.1 part by mass, the foam stability at the time of the production of the flexible polyurethane foam will be improved, and the cell coarsening and foam shrinkage will be suppressed. Further, the flame retardancy of the obtained flexible polyurethane foam will be improved.

The polyol compound (A) preferably has an average number of hydroxy groups of from 2 to 3. Here, the average number of hydroxy groups means an average value of the number of active hydrogen atoms of the initiator (a1).

When the average number of hydroxy groups of the polyol compound (A) is from 2 to 3, physical properties such as dry set of the obtained flexible polyurethane foam will be improved. Further, since the elongation of the obtained flexible polyurethane foam becomes high and its hardness does not become too high, physical properties such as tensile strength will be improved.

Particularly, when the polyol compound (A) contains from 20 to 100 mass % of a polyether diol having 2 hydroxy groups, it is easy to suppress the temperature sensitivity of the obtained flexible polyurethane foam, and an excellent flame retardancy is shown.

Further, the polyol compound (A) has a hydroxy value of preferably from 10 to 90 mgKOH/g, further preferably from 10 to 60 mgKOH/g.

When the hydroxy value of the polyol compound (A) is at least 10 mgKOH/g, e.g. collapse is suppressed and it becomes easy to produce the flexible polyurethane foam stably. Further, when the polyol compound (A) has a hydroxy value of at most 90 mgKOH/g, the flexibility of the obtained flexible polyurethane foam will be improved.

The unsaturation value of the polyol compound (A) is preferably at most 0.05 meq/g, more preferably at most 0.01 meq/g, further preferably at most 0.008 meq/g. When the unsaturation value is at most 0.05 meq/g, the durability of the obtained flexible polyurethane foam will be improved.

The lower limit of the unsaturation value is ideally 0 meq/g. The unsaturation value is measured by a method in accordance with JIS K 1557 (1970 edition).

The polyol compound (A) may be a polymer-dispersed polyol. Here, the polyol compound (A) being a polymer-dispersed polyol means that it constitutes a dispersion system wherein the polyol (A) is a base polyol (dispersing medium), and fine polymer particles (dispersoid) are stably dispersed.

By the presence of fine polymer particles in the polyol (A), the hydroxy value of the polyol compound (A) can be controlled to be low, and it is effective to improve the mechanical properties such that the flexible polyurethane foam is made to be hard.

As a polymer to be used as the fine polymer particles, an addition polymerization type polymer or a condensation polymerization type polymer may be mentioned.

The addition polymerization type polymer may, for example, be a polymer obtained by homopolymerization or copolymerization of a monomer such as acrylonitrile, styrene, a methacrylate or an acrylate.

The condensation polymerization type polymer may, for example, be polyester, polyurea, polyurethane or polymethylol melamine.

The content of the fine polymer particles in the polymer-dispersed polyol is not limited as long as the above effects are obtained, and is preferably from 0 to 50 mass % based on the polyol compound (A) (100 mass %). Here, various physical properties (such as the unsaturation value and the hydroxy value) as the polyol of such a polymer-dispersed polyol are considered with respect to the base polyol (the polyol compound (A)) excluding the fine polymer particles.

[Monool Compound (X)]

The monool compound (X) is a polyether monool obtained by ring-opening polymerization of an alkylene oxide (x2) with an initiator (x1) having 1 active hydrogen atom by using the DMC catalyst.

The initiator (x1) may, for example, be a monool such as methanol, ethanol, n-propyl alcohol, isopropyl alcohol, n-butyl alcohol or tert-butyl alcohol; a monohydric phenol such as phenol or nonylphenol; or a secondary amine such as dimethylamine or diethylamine.

Further, it is also possible to use a polyether monool obtained by ring-opening polymerization of an alkylene oxide, preferably propylene oxide with the above compound.

As the initiator (x1), the above compound may be used alone or in combination of two or more of them.

The alkylene oxide (x2) may, for example, be ethylene oxide, propylene oxide, 1,2-epoxybutane or 2,3-epoxybutane. Among them, preferred is to use only propylene oxide, or to use propylene oxide and ethylene oxide in combination, and more preferred is to use only propylene oxide.

The monool compound (X) is preferably a polyoxypropylene monool having only propylene oxide ring-opening polymerized with the initiator (x1) from the viewpoint that the durability of the obtained flexible polyurethane foam in a humid state is improved.

As the DMC catalyst to be used for the production of the monool compound (X), it is possible to use the same DMC catalyst as one used for the production of the polyol compound (A).

The amount of the DMC catalyst is preferably from 0.001 to 0.1 part by mass, more preferably from 0.003 to 0.3 part by mass, per 100 parts by mass of the total mass of the initiator (x1) and the alkylene oxide (x2).

When the amount of the DMC catalyst is from 0.001 to 0.1 part by mass, the foam stability at the time of the production of the flexible polyurethane foam will be improved, and the cell coarsening and foam shrinkage will be suppressed. Further, the flame retardancy of the obtained flexible polyurethane foam will be improved.

The average number of hydroxy groups of the monool compound (X) is 1. Further, the monool compound (X) has a hydroxy value of preferably from 5 to 200 mgKOH/g, more preferably from 5 to 120 mgKOH/g.

Further, the polyol composition (I) may contain the following polyol compound (B) and/or monool compound (Y).

[Polyol Compound (B)]

The polyol compound (B) is a polyol other than the polyol compound (A). That is, it is a polyol other than the polyol having an alkylene oxide ring-opening polymerized with an initiator by using the DMC catalyst. As the polyol compound (B), it is possible to use one usually used for the production of the flexible polyurethane foam, other than the polyol compound (A), and preferred is one containing at least the following polyol compound (B1).

(Polyol Compound (B1))

The polyol compound (B1) is a polyether polyol obtained by ring-opening polymerization of an alkylene oxide (b1-2) with an initiator (b1-1) by using an alkylene oxide ring-opening polymerization catalyst other than the DMC catalyst, and having an average number of hydroxy groups of from 2 to 3.

The alkylene oxide ring-opening polymerization catalyst other than the DMC catalyst is preferably a phosphazenium complex compound or a Lewis acid compound, more preferably an alkali metal compound catalyst.

The alkali metal compound catalyst may, for example, be potassium hydroxide (KOH) or cesium hydroxide (CsOH).

The initiator (b1-1) is a compound having 2 or 3 active hydrogen atoms, and it may, for example, be a polyhydric alcohol such as ethylene glycol, propylene glycol, 1,4-butanediol, diethylene glycol, dipropylene glycol, glycerin or trimethylolpropane; a polyhydric phenol such as bisphenol A; or an amine such as monoethanolamine, diethanolamine, triethanolamine or piperazine. Among them, preferred is a polyhydric alcohol. Further, it is preferred to use a polyether polyol having a high hydroxy value obtained by ring-opening polymerization of an alkylene oxide, preferably propylene oxide, with such a compound.

As the initiator (b1-1), the compound may be used alone or in combination of two or more of them.

The alkylene oxide (b1-2) may, for example, be ethylene oxide, propylene oxide, 1,2-epoxybutane or 2,3-epoxybutane. Among them, preferred is to use only propylene oxide, or to use propylene oxide and ethylene oxide in combination.

The polyol compound (B1) is preferably a polyoxypropylene polyol having only propylene oxide ring-opening polymerized with the initiator (b1-1) from the viewpoint that the durability of the obtained flexible polyurethane foam in a humid state is improved.

Further, as the polyol compound (B1), it is preferred to use in combination of a polyoxypropylene polyol obtained by ring-opening polymerization of only propylene oxide with the initiator (b1-1), and a polyoxypropyleneoxyethylene polyol obtained by ring-opening polymerization of a mixture of propylene oxide with ethylene oxide and having an oxyethylene group content of an oxyalkylene group of from 50 to 100 mass %, whereby the durability of the obtained flexible polyurethane foam in a humid state is further improved. Here, in a case where the polyoxypropyleneoxyethylene polyol is used, its content in the polyol compound (B1) (100 mass %) is preferably from 1 to 20 mass %, more preferably from 2 to 15 mass %.

The polyol compound (B1) has an average number of hydroxy groups of from 2 to 3. When the average number of hydroxy groups is from 2 to 3, physical properties such as dry set and the elongation of the obtained flexible polyurethane foam will be improved, and its hardness does not become too high and physical properties such as tensile strength will be improved.

Further, the polyol compound (B1) has an average number of hydroxy groups of more preferably from 2.0 to 2.7, further preferably from 2.0 to 2.6. When the average number of hydroxy groups of the polyol compound (B1) is within such a range, it is possible to control the rebound resilience to be low and to obtain a flexible polyurethane foam which shows little change in hardness (the temperature sensitivity is suppressed).

Further, as the polyol compound (B1), preferred is to use a polyether diol having an average number of hydroxy groups of 2 and a polyether triol having an average number of hydroxy groups of 3 in combination. The proportion of the polyether diol having an average number of hydroxy groups of 2 contained in the polyol compound (B1) is preferably at least 30 mass % in the polyol compound (B1) (100 mass %).

The polyol compound (B1) has a hydroxy value of from 15 to 250 mgKOH/g, preferably from 20 to 200 mgKOH/g. When the hydroxy value is at least 15 mgKOH/g, e.g. collapse is suppressed and it becomes easy to produce the flexible polyurethane foam stably. Further, when the hydroxy value is at most 250 mgKOH/g, the flexibility of the obtained flexible polyurethane foam will be improved, and it is possible to control the rebound resilience to be low.

The polyol compound (B1) may be a polymer-dispersed polyol. The polymer of fine polymer particles may be the same one as described above with respect to the polyol compound (A). Further, the content of the fine polymer particles in the polymer-dispersed polyol is preferably from 0 to 50 mass %, more preferably from 0 to 20 mass %, based on the polyol compound (B).

(Polyol Compound (B2))

Further, the polyol compound (B) may contain a polyol compound (B2) in addition to the polyol compound (B1). The polyol compound (B2) is a polyol having an average number of hydroxy groups of from 2 to 6 and having a hydroxy value of from 251 to 1,830 mgKOH/g.

The polyol compound (B2) may, for example, be a polyhydric alcohol, an amine having an average number of hydroxy groups of from 2 to 6, polyester polyol, polycarbonate polyol or polyether polyol.

The polyhydric alcohol may, for example, be ethylene glycol, propylene glycol, 1,4-butanediol, dipropylene glycol, glycerin, diglycerin, pentaerythritol or sorbitol.

The amine having an average number of hydroxy groups of from 2 to 6 may, for example, be diethanolamine, triethanolamine, ethylenediamine or diethylenetriamine.

The polyether polyol may be a polyether polyol obtained by ring-opening polymerization of an alkylene oxide (b2-2) with an initiator (b2-1) by using an alkylene oxide ring-opening polymerization catalyst other than the DMC catalyst. As the alkylene oxide ring-opening polymerization catalyst other than the DMC catalyst, the same one as described above with respect to the polyol compound (B1) can be used.

As the initiator (b2-1), the above polyhydric alcohol or the initiator (b1-1) as described above with respect to the polyol compound (B1) can be used.

The alkylene oxide (b2-2) may, for example, be ethylene oxide, propylene oxide, 1,2-epoxybutane or 2,3-epoxybutane. Among them, preferred is to use only propylene oxide, or to use propylene oxide and ethylene oxide in combination, and more preferred is to use only propylene oxide.

The polyol compound (B2) is preferably a polyether polyol, more preferably a polyoxypropylene polyol having only propylene oxide ring-opening polymerized with the initiator (b2-1). By ring-opening polymerization of only propylene oxide, the durability of the obtained flexible polyurethane foam in a humid state is improved.

As the polyol compound (B2), the compound may be used alone or in combination of two or more of them.

The polyol compound (B2) functions as a crosslinking agent, and the foam stability of the obtained flexible polyurethane foam will be excellent and the mechanical properties such as hardness can be improved.

The amount of the polyol compound (B2) is preferably at most 10 parts by mass, more preferably at most 5 parts by mass, further preferably at most 2 parts by mass, to the total mass (100 parts by mass) of the polyol compound (A) and the polyol compound (B1). When the mass proportion of the polyol compound (B2) is within such a range, the foam stability at the time of the production of the flexible polyurethane foam will be excellent.

(Polyol Compound (B3))

Further, the polyol compound (B) may contain a polyol compound (B3) having an average number of hydroxy groups of from 3.1 to 6.0 and having a hydroxy value of from 15 to 250 mgKOH/g, other than the polyol compounds.

The polyol compound (B3) may preferably be a polyoxypropyleneoxyethylene polyol having an oxyethylene group content of an oxyalkylene group of from 50 to 100 mass %.

The amount of the polyol compound (B3) is preferably at most 10 parts by mass, more preferably at most 7 parts by mass, to the total mass (100 parts by mass) of the polyol compound (A) and the polyol compound (B1). When the mass proportion of the polyol compound (B3) is within such a range, the air flow will be improved, and further, the foam stability at the time of the production of the flexible polyurethane foam will be excellent.

[Monool Compound (Y)]

The monool compound (Y) is a monool other than the monool compound (X) having an alkylene oxide ring-opening polymerized with an initiator by using the DMC catalyst, and preferably a polyether monool obtained by ring-opening polymerization of an alkylene oxide (y2) with an initiator (y1) by using an alkylene oxide ring-opening polymerization catalyst other than the DMC catalyst.

The alkylene oxide ring-opening addition polymerization catalyst other than the DMC catalyst is preferably a phosphazenium complex compound or a Lewis acid compound, more preferably an alkali metal compound catalyst.

The alkali metal compound catalyst may, for example, be potassium hydroxide (KOH) or cesium hydroxide (CsOH).

The initiator (y1) may, for example, be a monool such as methanol, ethanol, n-propyl alcohol, isopropyl alcohol, n-butyl alcohol or tert-butyl alcohol; a monohydric phenol such as phenol or nonylphenol; or a secondary amine such as dimethylamine or diethylamine.

Further, it is also possible to use a polyether monool obtained by ring-opening polymerization of an alkylene oxide, preferably propylene oxide with the above compound.

As the initiator (y1), the above compound may be used alone or in combination of two or more of them.

The alkylene oxide (y2) may, for example, be ethylene oxide, propylene oxide, 1,2-epoxybutane or 2,3-epoxybutane. Among them, preferred is to use only propylene oxide, or to use propylene oxide and ethylene oxide in combination, and more preferred is to use only propylene oxide.

The monool compound (Y) is preferably a polyoxypropylene monool having only propylene oxide ring-opening polymerized with the initiator (y1). By ring-opening addition polymerization of only propylene oxide, the durability of the obtained flexible polyurethane foam in a humid state is improved.

The average number of hydroxy groups of the monool compound (Y) is 1. Further, the monool compound (Y) has a hydroxy value of preferably from 5 to 200 mgKOH/g, more preferably from 5 to 120 mgKOH/g.

[Polyol Composition (I)]

The polyol composition (I) of the present invention contains at least one of the polyol compound (A) and the poly compound (B). Further, the polyol composition (I) contains at least one of the polyol compound (A) and the monool compound (X). That is, as the polyol composition (I) of the present invention, one of the following combinations can be used.

(1) Polyol composition (I) using only the polyol compound (A) as a polyol compound (the polyol (A) alone type)

(1a) Polyol composition (I) comprising only the polyol compound (A)

(1b) Polyol composition (I) comprising the polyol compound (A) and the monool compound (X)

(1c) Polyol composition (I) comprising the polyol compound (A) and the monool compound (Y)

(1d) Polyol composition (I) comprising the polyol compound (A), the monool compound (X) and the monool compound (Y)

(2) Polyol composition (I) using only the polyol compound (B) as a polyol compound (the polyol (B) alone type)

(2a) Polyol composition (I) comprising the polyol compound (B) and the monool compound (X)

(2b) Polyol composition (I) comprising the polyol compound (B), the monool compound (X) and the monool compound (Y)

(3) Polyol composition (I) using the polyol compound (A) and the polyol compound (B) in combination as a polyol compound (polyol combination use type)

(3a) Polyol composition (I) comprising the polyol compound (A) and the polyol compound (B)

(3b) Polyol composition (I) comprising the polyol compound (A), the polyol compound (B) and the monool compound (X)

(3c) Polyol composition (I) comprising the polyol compound (A), the polyol compound (B) and the monool compound (Y)

(3d) Polyol composition (I) comprising the polyol compound (A), the polyol compound (B), the monool compound (X) and the monool compound (Y)

With respect to the polyol (A) alone type (1), the mass proportion of the polyol compound (A) in the polyol composition (I) (100 mass %) is preferably at least 75 mass %, more preferably at least 80 mass %.

The monool compound (X) in the polyol composition (I) is preferably at most 30 parts by mass, more preferably at most 25 parts by mass, per 100 parts by mass of the polyol compound (A).

The monool compound (Y) in the polyol composition (I) is preferably at most 30 parts by mass, more preferably at most 25 parts by mass, per 100 parts by mass of the polyol compound (A).

With respect to the polyol alone type (1), when the polyol compound (A), the monool compound (X) and the monool compound (Y) are within the above mentioned range, it will be easy to produce the flexible polyurethane foam substantially without using a silicone foam stabilizer. Further, it will be easy to obtain the flexible polyurethane foam excellent in durability and having a good air flow.

With respect to the polyol (B) alone type (2), the mass proportion of the polyol compound (B1) in the polyol composition (I) (100 mass %) is preferably from 75 to 95 mass %, more preferably from 80 to 95 mass %.

Further, with respect to the polyol compound (B2) and (B3), it is preferred that the polyol compound (B2) is from 0 to 10 parts by mass and the polyol compound (B3) is from 0 to 10 parts by mass, per 100 parts by mass of the total amount of the polyol compound (B1).

The mass proportion of the monool compound (X) in the polyol composition (I) (100 mass %) is preferably from 5 to 20 mass %, more preferably from 5 to 15 mass %.

The mass proportion of the monool compound (Y) in the polyol composition (I) (100 mass %) is preferably from 5 to 20 mass %, more preferably from 5 to 15 mass %.

With respect to the polyol alone type (2), when the polyol compound (B), the monool compound (X) and the monool compound (Y) are within the above mentioned range, it will be easy to produce the flexible polyurethane foam substantially without using a silicone foam stabilizer. Further, it will be easy to obtain the flexible polyurethane foam excellent in durability and having a good air flow.

With respect to the polyol combination use type (3), the mass proportion of the polyol compound (A) is preferably from 5 to 50 mass %, more preferably from 10 to 30 mass %, per the total mass (100 mass %) of the polyol compound (A) and the polyol compound (B1).

Further, the total mass proportion of the polyol compound (A) and the polyol compound (B1) in the polyol composition (I) (100 mass %) is preferably at least 75 mass %, more preferably at least 80 mass %.

When the total mass proportion of the polyol compound (A) and the polyol compound (B1) in the polyol composition (I) is within the above mentioned range, it will be easy to produce the flexible polyurethane foam substantially without using a silicone foam stabilizer. Further, it will be easy to obtain the flexible polyurethane foam excellent in durability and having a good air flow.

The monool compound (X) is preferably at most 30 parts by mass, more preferably at most 25 parts by mass, per the total mass (100 parts by mass) of the polyol compound (A) and the polyol compound (B1).

The monool compound (Y) is preferably at most 30 parts by mass, more preferably at most 25 parts by mass, per the total mass (100 parts by mass) of the polyol compound (A) and the polyol compound (B1).

When the mass proportions of the monool compound (X) and the monool compound (Y) are within the above mentioned range, it will be easy to obtain the flexible polyurethane foam excellent in durability and having a good air flow.

A specific example of a proper composition of the polyol composition (I) in the polyol combination use type (3) may be one comprising from 5 to 50 parts by mass of the polyol compound (A), from 50 to 95 parts by mass of the polyol compound (B1), from 0 to 10 parts by mass of the polyol compound (B2), from 0 to 10 parts by mass of the polyol compound (B3), from 0 to 30 parts by mass of the monool compound (X) and from 0 to 30 parts by mass of the monool compound (Y) (here, the total of the polyol compounds (A) and (B1) is 100 parts by mass.).

<Polyisocyanate Composition (II)>

A polyisocyanate composition (II) is reacted with the polyol composition (I) to obtain the flexible polyurethane foam, and may, for example, be an aromatic, alicyclic or fatty polyisocyanate having at least two isocyanate groups, a mixture of at least two such polyisocyanates, or a modified polyisocyanate obtainable by modifying such a polyisocyanate or a polyisocyanate mixture.

The polyisocyanate may, for example, be tolylene diisocyanate (TDI), diphenylmethane diisocyanate (MDI), polymethylenepolyphenyl polyisocyanate (so-called crude MDI), xylylene diisocyanate (XDI), isophorone diisocyanate (IPDI) or hexamethylene diisocyanate (HMDI).

The modified polyisocyanate may, for example, be a prepolymer type modified product, a nurate modified product, a urea modified product or a carbodiimide modified product of the above polyisocyanates.

As the polyisocyanate composition (II), TDI, MDI, crude MDI or a modified product thereof is preferably used. Among them, it is more preferred to use TDI, crude MDI or a modified product thereof (particularly preferred is a prepolymer type modified product) from the viewpoint that the foam stability, durability or the like is improved. Further, among TDI, crude MDI and a modified product thereof, it is preferred to use a polyisocyanate having a relatively low reactivity from the viewpoint that the air flow of the obtained flexible polyurethane foam is excellent. For example, a TDI mixture of 2,4-TDI/2,6-TDI=80/20 mass % or a TDI mixture wherein the proportion of 2,6-TDI is large (particularly preferably at least 30 mass %) may be mentioned.

In the production process of the present invention, the isocyanate index of the polyisocyanate composition (II) to the polyol composition (I) to be reacted is preferably from 90 to 130, more preferably from 95 to 110, further preferably from 100 to 110. Here, the isocyanate index is represented by 100 times a numerical value obtained by dividing the equivalent amount of isocyanate groups in the polyisocyanate composition (II) by the equivalent amount of the total of all active hydrogen atoms in the polyol composition (I), water, etc.

When the isocyanate index is at least 90, the influence of the used polyol composition (I) as the plasticizer will be appropriate, and it will be possible to obtain a flexible polyurethane foam having excellent washing durability. Further, the after mentioned urethane-forming catalyst will not be readily dissipated, and the obtained flexible polyurethane foam will be unlikely to undergo a color change.

<Foam Stabilizer>

The production process of the present invention comprises reacting a polyol composition (I) and a polyisocyanate composition (II) substantially without using a silicone foam stabilizer. Here, "substantially without using a silicone foam stabilizer" means that the silicon content in the silicone foam stabilizer is at most 0.05 mass % to the polyol composition (I) (100 mass %). The silicon content in the silicone foam stabilizer to the polyol composition (I) (100 mass %) is preferably at most 0.03 mass %, particularly preferably zero.

The silicone foam stabilizer contained in the flexible polyurethane foam can be detected by e.g. an analysis by gas chromatography.

Further, the silicone foam stabilizer has a combustion improving effect when the foam burns, and when the foam is melted into a liquid by heat, the silicone foam stabilizer gathers on the liquid surface by the surface active effect to prevent carbonization. The flexible polyurethane foam obtained by the production process of the present invention is considered to have excellent flame retardancy, since the silicone foam stabilizer is not substantially used.

<Urethane-Forming Catalyst>

The reaction of the polyol composition (I) and the polyisocyanate composition (II) is carried out in the presence of a urethane-forming catalyst.

The urethane-forming catalyst is a catalyst promoting the urethane-forming reaction and is made of a metal catalyst and an amine catalyst. The urethane-forming catalyst comprises the metal catalyst as an essential component and comprises the amine catalyst in combination, whereby a flexible polyurethane foam having an excellent cell state can be produced in an open system.

The metal catalyst may, for example, be a metal carboxylate such as potassium acetate, potassium 2-ethylhexanoate or tin 2-ethylhexanoate, or an organic metal compound such as stannous acetate, stannous octylate, stannous oleate, stannous laurate, dibutyltin diacetate, dibutyltin dilauratete, dibutyltin dichloride, lead actanoate, lead naphthenate, nickel naphthenate or cobalt naphthenate.

The amine catalyst may, for example, be triethylamine, tripropylamine, polyisopropanolamine, tributylamine, trioctylamine, hexamethyldimethylamine, N-methylmorpholine, N-ethylmorpholine, N-octadecylmorpholine, diethylenetriamine, N,N,N',N'-tetramethylethylenediamine, N,N,N', N'-tetramethylpropylenediamine, N,N,N',N'-tetramethylbutanediamine, N,N,N',N'-tetramethyl-1,3-butanediamine, N,N,N',N'-tetramethylhexamethylenediamine, bis[2-(N,N-dimethylamino)ethyl)ether, N,N-dimethylbenzylamine, N,N-dimethylcyclohexylamine, N,N,N',N'-pantamethyldietylenetriamine or triethylenediamine; an organic salt or an inorganic salt of the above compound; an oxyalkylene adduct of an amino group in a primary or secondary amine; an azacyclic compound such as a N,N-dialkylpiperazine; or a N,N',N"-trialkylaminoalkylhexahydrotriazine.

The amount of the metal catalyst to be used as a urethane-forming catalyst varies somewhat depending on the type of the polyol composition (I) to be used, but it is from 0.1 to 2.0 parts by mass, preferably from 0.3 to 1.5 parts by mass, per 100 parts by mass of the polyol composition (I).

The amount of the amine catalyst to be used as a urethane-forming catalyst is from 0.1 to 1.5 parts by mass, preferably from 0.2 to 1.0 part by mass, per 100 parts by mass of the polyol composition (I).

<Blowing Agent>

The blowing agent may, for example, be a known blowing agent such as water, an inert gas or a fluorinated hydrocarbon. Among them, preferred is to use water and/or an inert gas, more preferred is to use water. The inert gas may, for example, be air, nitrogen or carbon dioxide.

As the blowing agent, preferred is to use only water.

When water is used as the blowing agent, the amount of the blowing agent is preferably at most 10 parts by mass, more preferably from 0.1 to at most 4 parts by mass, per 100 parts by mass of the polyol composition (I).

<Other Additives>

In the production of the flexible polyurethane foam of the present invention, additives may be used in addition to the urethane-forming catalyst and blowing agent.

As such additives, a filler such as potassium carbonate or barium sulfate; a surfactant such as an emulsifier; an aging-preventive agent such as an antioxidant or an ultraviolet absorber; a flame retardant, a plasticizer, a coloring agent, an antifungal agent, a cell opener, a dispersant and a discoloration-preventive agent, if necessary, for a supplemental use may, for example, be mentioned.

<Reaction>

The method of mixing of the respective components may be a method (slab method) wherein the respective components are mixed in an open system and a reactive mixture is foamed. Specifically, a known method such as one shot method, a semiprepolymer method or a prepolymer method may be mentioned. Further, for the production of a flexible polyurethane foam, a production apparatus commonly used, may be used.

The core density of the flexible polyurethane foam is preferably from 15 to 110 kg/cm$^3$, more preferably from 20 to 80 kg/cm$^3$, most preferably from 40 to 80 kg/cm$^3$. The density is measured by a method in accordance with JIS K6400 (1997 edition).

In the above described production process of the present invention, by using the polyol compound (A) and/or the monool compound (X), having an alkylene oxide ring-opening polymerized with an initiator by using the DMC catalyst, a flexible polyurethane foam can be produced in an open system substantially without using a silicone foam stabilizer. For the reason, it is considered that partially reversed direction where an alkylene oxide attaches, when the alkylene oxide is subjected to ring-opening polymerization with an initiator by using the DMC catalyst, is involved.

For example, when propylene oxide is subjected to ring-opening polymerization with an initiator by using the DMC catalyst to produce the polyol compound or the monool compound, the propylene oxide attaches from not only the primary carbon side but also from the second carbon side with a proportion of about from 5 to 10%. It is considered that by the production process of the present invention, the flexible polyurethane foam can be produced without using a silicone foam stabilizer, since the polyoxyalkylene chain of the polyol compound or the monool compound acts to strengthen the surface tension of the foam at the time of a urethane-forming reaction.

On the other hand, if propylene oxide is subjected to ring-opening polymerization with an initiator by using a catalyst such as potassium hydroxide, propylene oxide attaches to only from the primary carbon side. Therefore, it is consider that there is no act to strengthen the surface tension of the foam at the time of a urethane-forming reaction, and the flexible polyurethane foam cannot be produced without using the foam stabilizer.

EXAMPLES

Now, the present invention will be described in further detail with reference to Examples and Comparative Examples, but it should be understood that the present invention is by no means limited thereto. "Parts" in Examples and Comparative Examples represents "parts by mass".

Raw materials used for the production of the flexible polyurethane foam are as follows.

[Polyol Composition (I)]
(Polyol Compound (A))

Polyol A1: Using a potassium hydroxide catalyst and dipropylene glycol as an initiator, propylene oxide was subjected to ring-opening polymerization to a molecular weight of 1,000, followed by purification with magnesium silicate to produce an initiator (a1). Then, with the initiator (a1), by using a zinc hexacyanocobaltate-tert-butyl alcohol complex catalyst as a DMC catalyst, propylene oxide as an alkylene oxide (a2) was subjected to ring-opening polymerization to obtain a polyoxypropylene polyol (a polyol A1). The polyol A1 has an average number of hydroxy groups of 2, a hydroxy value of 14 mgKOH/g and an unsaturation value of 0.005 meq/g.

Polyol A2: Using a potassium hydroxide catalyst and dipropylene glycol as an initiator, propylene oxide was subjected to ring-opening polymerization to a molecular weight of 1,000, followed by purification with magnesium silicate to produce an initiator (a1). Then, with the initiator (a1), by using a zinc hexacyanocobaltate-tert-butyl alcohol complex catalyst as a DMC catalyst, propylene oxide as an alkylene oxide (a2) was subjected to ring-opening polymerization to obtain a polyoxypropylene polyol (a polyol A2). The polyol A2 has an average number of hydroxy groups of 2, a hydroxy value of 11 mgKOH/g and an unsaturation value of 0.005 meq/g.

Polyol A3: Using a potassium hydroxide catalyst and glycerin as an initiator, propylene oxide was subjected to ring-opening polymerization to a molecular weight of 1,000, followed by purification with magnesium silicate to produce an initiator (a1). Then, with the initiator (a1), by using a zinc hexacyanocobaltate-tert-butyl alcohol complex catalyst as a DMC catalyst, propylene oxide as an alkylene oxide (a2) was subjected to ring-opening polymerization to obtain a polyoxypropylene polyol (a polyol A3). The polyol A3 has an average number of hydroxy groups of 3, a hydroxy value of 56 mgKOH/g and an unsaturation value of 0.005 meq/g.

Polyol A4: Using a potassium hydroxide catalyst and glycerin as an initiator, propylene oxide was subjected to ring-opening polymerization to a molecular weight of 1,000, followed by purification with magnesium silicate to produce an initiator (a1). Then, with the initiator (a1), by using a zinc hexacyanocobaltate-tert-butyl alcohol complex catalyst as a DMC catalyst, a mixture of propylene oxide and ethylene oxide as an alkylene oxide (a2) was subjected to ring-opening polymerization to obtain a polyoxyethylenepolyoxypropylene polyol (a polyol A4). The polyol A4 has an average number of hydroxy groups of 3, a hydroxy value of 56 mgKOH/g, an unsaturation value of 0.005 meq/g and a total oxyethylene group content of 7 mass %.

Polyol A5: A fine polymer particles-dispersed polyol having an amount of fine polymer particles obtained by copolymerization of acrylonitrile and styrene in the polyol A4, of 42 mass %, an average number of hydroxy groups of 3 and a hydroxy value of 32 mgKOH/g.

(Polyol Compound (B))

Polyol B1-1: With dipropylene glycol as an initiator (b1-1), by using a potassium hydroxide catalyst, propylene oxide as an alkylene oxide (b1-2) was subjected to ring-opening polymerization to obtain a polyoxypropylene polyol (a polyol B1-1). The polyol B1-1 has an average number of hydroxy groups of 2 and a hydroxy value of 160 mgKOH/g.

Polyol B1-2: With glycerin as an initiator (b1-1), by using a potassium hydroxide catalyst, propylene oxide as an alkylene oxide (b1-2) was subjected to ring-opening polymerization to obtain a polyoxypropylene polyol (a polyol B1-2). The polyol B1-2 has an average number of hydroxy groups of 3 and a hydroxy value of 168 mgKOH/g.

Polyol B1-3: With glycerin as an initiator (b1-1), by using a potassium hydroxide catalyst, propylene oxide as an alkylene oxide (b1-2) was subjected to ring-opening polymerization to obtain a polyoxypropylene polyol (a polyol B1-3). The polyol B1-3 has an average number of hydroxy groups of 3 and a hydroxy value of 56 mgKOH/g.

Polyol B1-4: With glycerin as an initiator (b1-1), by using a potassium hydroxide catalyst, a mixture of propylene oxide and ethylene oxide as an alkylene oxide (b1-2) was subjected to ring-opening polymerization to obtain a polyoxypropylene polyol (a polyol B1-4). The polyol B1-4 has an average number of hydroxy groups of 3, a hydroxy value of 48 mgKOH/g and a total oxyethylene group content of 80 mass %.

Polyol B1-5: With glycerin as an initiator (b1-1), by using a potassium hydroxide catalyst, a mixture of propylene oxide and ethylene oxide as an alkylene oxide (b1-2) was subjected to ring-opening polymerization to obtain a polyoxypropylene polyol (a polyol B1-5). The polyol B1-5 has an average number of hydroxy groups of 3, a hydroxy value of 56 mgKOH/g and a total oxyethylene group content of 7 mass %.

(Monool Compound (X))

Monool X1: With n-butyl alcohol as an initiator (x1), by using a zinc hexacyanocobaltate-tert-butyl alcohol complex catalyst as a DMC catalyst, propylene oxide as an alkylene oxide (x2) was subjected to ring-opening polymerization to obtain a polyoxypropylene monool (a monool X1). The monool X1 has an average number of hydroxy groups of 1 and a hydroxy value of 17 mgKOH/g.

Monool X2: With n-butyl alcohol as an initiator (x1), by using a zinc hexacyanocobaltate-tert-butyl alcohol complex catalyst as a DMC catalyst, propylene oxide as an alkylene oxide (x2) was subjected to ring-opening polymerization to obtain a polyoxypropylene monool (a monool X2). The monool X2 has an average number of hydroxy groups of 1 and a hydroxy value of 11 mgKOH/g.

(Monool Compound (Y))

Monool Y1: With n-butyl alcohol as an initiator (y1), by using a potassium hydroxide catalyst, propylene oxide as an alkylene oxide (y2) was subjected to ring-opening polymerization to obtain a polyoxypropylene monool (a monool Y1). The monool Y1 has an average number of hydroxy groups of 1 and a hydroxy value of 22 mgKOH/g.

[Polyisocyanate Composition (II)]

Polyisocyanate I1: TDI-80 (mixture of 2,4-TDI/2,6-TDI=80/20 mass %), isocyanate group content: 48.3 mass % (tradename: CORONATE T-80, manufactured by Nippon Polyurethane Industry Co., Ltd.)

[Urethane-Forming Catalyst]

Metal catalyst M1: Dibutyltin dilaurate (tradename: NEOSTANN U-100, manufactured by Nitto Kasei Co., Ltd.)

Metal catalyst M2: Tin 2-ethylhexanoate (tradename: DABCO T-9, manufactured by Air Products and Chemicals, Inc.)

Amine catalyst N1: Solution of triethylenediamine in dipropylene glycol (tradename: TEDA-L33, manufactured by TOSOH CORPORATION)

[Blowing Agent]

Blowing agent: Water

[Silicone Foam Stabilizer]

Foam stabilizer S1: Silicone foam stabilizer having a silicon content of 15.5% (tradename: SZ-1328, manufactured by Dow Corning Toray Co., Ltd.)

Examples and Comparative Examples will be described below.

Example 1

A mixture (hereinafter referred to as a polyol system) of the polyol A1 (23.5 parts), the polyol B1-1 (33 parts), the polyol B1-2 (41 parts), the polyol B1-4 (12 parts), the monool X1 (7.5 parts), water (1.44 parts), the metal catalyst M1 (0.4 part) and the amine catalyst N1 (0.25 part), was adjusted to a liquid temperature of 21±1° C. Further, the polyisocyanate I1 (isocyanate index: 100) was adjusted to a liquid temperature of 21±1° C. Then, to the polyol system, the polyisocyanate I1 was added, followed by mixing for 5 seconds by a mixer (rotational speed: 1.425 rpm), and the mixture was injected at room temperature into a wooden box having 300 mm in length and width and 300 mm in height with an open top and lined with a plastic sheet, to produce a flexible polyurethane foam (slab foam). Then, the obtained flexible polyurethane foam was taken out and left to stand for over 24 hours in a room adjusted to have room temperature of 23° C. and a humidity of 50%, whereupon various physical properties were measured.

Examples 2 to 26

A flexible polyurethane foam was produced in the same manner as in Example 1 except that compositions of used raw materials were changed as shown in Tables 1 and 2.

TABLE 1

| | | Ex. | 1 | 2 | 3 | 4 | 5 | 6 | 7 |
|---|---|---|---|---|---|---|---|---|---|
| Polyol composition (I) | Polyol Compound (A) | A1 | 23.5 | 23.5 | 23.5 | — | — | — | — |
| | | A2 | — | — | — | 23.5 | — | — | — |
| | | A3 | — | — | — | — | 100 | 100 | 100 |
| | | A4 | — | — | — | — | — | — | — |
| | Polyol Compound (B) | B1-1 | 33 | 33 | 33 | 33 | — | — | — |
| | | B1-2 | 41 | 41 | 41 | 41 | — | — | — |
| | | B1-3 | — | — | — | — | — | — | — |
| | | B1-4 | 12 | 12 | 12 | 12 | — | — | — |
| | | B1-5 | — | — | — | — | — | — | — |
| | Monool compound (X) | X1 | 7.5 | 7.5 | 7.5 | 7.5 | — | — | — |
| | | X2 | — | — | — | — | — | — | — |
| Polyisocyanate composition (II) Isocyanate index | | I1 | 100 | 100 | 100 | 100 | 100 | 100 | 100 |
| Urethane-forming catalyst | Metal catalyst | M1 | 0.4 | 0.1 | 0.05 | 0.1 | — | — | 0.3 |
| | | M2 | — | — | — | — | 0.8 | 0.4 | — |
| | Amine catalyst | N1 | 0.25 | 0.25 | 0.25 | 0.25 | 0.25 | 0.25 | 0.25 |
| Silicone foam stabilizer | | S1 | | | | | | | |
| Blowing agent | | Water | 1.44 | 1.44 | 1.44 | 1.44 | 1.44 | 1.44 | 1.44 |
| Moldability | Foam stability | | Δ | Δ | Δ | Δ | ◯ | ◯ | ◯ |
| | Cell state | | ◯ | ◯ | ◯ | ◯ | ◯ | ◯ | ◯ |
| | Foam shrinkage | | ◯ | ◯ | ◯ | ◯ | ◯ | ◯ | ◯ |
| Physical properties | Core density (kg/m$^3$) | | 64.4 | 62.3 | 65.6 | 61.8 | 56.0 | 55.0 | 57.9 |
| | Rebound resilience of core (%) | | 18 | 19 | 17 | 17 | 62 | 58 | 62 |
| | 25% ILD (N/314 cm$^2$) | | 49 | 43 | 41 | 40 | 104 | 104 | 124 |
| | Air flow (L/min.) | | 85.9 | 107.0 | 121.0 | 120.0 | 56.5 | 92.5 | 108.5 |
| | Tensile strength (kPa) | | 74 | 70 | 68 | 50 | 62 | 58 | 64 |
| | Elongation (%) | | 220 | 218 | 213 | 204 | 123 | 112 | 118 |
| | Dry set (%) | | 3.4 | 2.3 | 3.4 | 4.8 | 1.5 | 2.1 | 1.3 |
| | Wet set (%) | | 1.1 | 0.4 | 0.8 | 2.7 | 1.6 | 1.7 | 1.7 |

| | | Ex. | 8 | 9 | 10 | 11 | 12 | 13 |
|---|---|---|---|---|---|---|---|---|
| Polyol composition (I) | Polyol Compound (A) | A1 | — | — | — | — | — | — |
| | | A2 | — | — | — | — | — | — |
| | | A3 | 100 | 100 | 100 | 100 | 100 | — |
| | | A4 | — | — | — | — | — | 100 |
| | Polyol Compound (B) | B1-1 | — | — | — | — | — | — |
| | | B1-2 | — | — | — | — | — | — |
| | | B1-3 | — | — | — | — | — | — |
| | | B1-4 | — | — | — | — | — | — |
| | | B1-5 | — | — | — | — | — | — |
| | Monool compound (X) | X1 | — | — | — | 7.5 | — | — |
| | | X2 | — | — | — | — | — | — |
| Polyisocyanate composition (II) Isocyanate index | | I1 | 100 | 100 | 100 | 100 | 100 | 100 |
| Urethane-forming catalyst | Metal catalyst | M1 | 0.5 | 0.5 | 0.8 | — | — | — |
| | | M2 | — | — | — | 0.8 | 0.8 | 0.4 |
| | Amine catalyst | N1 | 0.25 | 0.25 | 0.25 | 0.25 | 0.25 | 0.25 |
| Silicone foam stabilizer | | S1 | | 0.2 | | | | |
| Blowing agent | | Water | 1.44 | 1.44 | 1.44 | 1.44 | 1.44 | 1.44 |

TABLE 1-continued

| | | | | | | | |
|---|---|---|---|---|---|---|---|
| Moldability | Foam stability | ○ | ○ | ○ | ○ | ○ | ○ |
| | Cell state | ○ | ○ | ○ | ○ | ○ | ○ |
| | Foam shrinkage | ○ | ○ | ○ | ○ | ○ | ○ |
| Physical properties | Core density (kg/m$^3$) | 56.0 | 59.7 | 55.7 | 59.5 | 60.7 | 56.7 |
| | Rebound resilience of core (%) | 55 | 53 | 54 | 62 | 58 | 57 |
| | 25% ILD (N/314 cm$^2$) | 107 | 119 | 104 | 98 | 110 | 116 |
| | Air flow (L/min.) | 110.5 | 96.3 | 116.0 | 40.0 | 87.8 | 69.8 |
| | Tensile strength (kPa) | 59 | 62 | 57 | 54 | 60 | 58 |
| | Elongation (%) | 117 | 138 | 118 | 139 | 129 | 113 |
| | Dry set (%) | 1.5 | 1.8 | 2.0 | 1.9 | 1.2 | 2.1 |
| | Wet set (%) | 2.1 | 2.9 | 3.2 | 1.3 | 2.4 | 1.7 |

TABLE 2

| | | Ex. | 14 | 15 | 16 | 17 | 18 | 19 | 20 |
|---|---|---|---|---|---|---|---|---|---|
| Polyol composition (I) | Polyol Compound (A) | A1 | — | — | — | — | — | — | — |
| | | A2 | — | — | — | — | — | — | — |
| | | A3 | 100 | 50 | 50 | 50 | — | — | — |
| | | A4 | — | — | — | — | — | — | — |
| | | A5 | — | 50 | 50 | 50 | 100 | 100 | 100 |
| | Polyol Compound (B) | B1-1 | — | — | — | — | — | — | — |
| | | B1-2 | — | — | — | — | — | — | — |
| | | B1-3 | — | — | — | — | — | — | — |
| | | B1-4 | — | — | — | — | — | — | — |
| | | B1-5 | — | — | — | — | — | — | — |
| | Monool compound (X) | X1 | — | — | — | — | — | — | — |
| | | X2 | — | — | — | — | — | — | — |
| Polyisocyanate composition (II) Isocyanate index | | I1 | 100 | 100 | 100 | 100 | 100 | 100 | 100 |
| Urethane-forming catalyst | Metal catalyst | M1 | — | — | — | — | — | — | — |
| | | M2 | 1.0 | 1.0 | 1.0 | 1.5 | 1.0 | 1.0 | 1.2 |
| | Amine catalyst | N1 | 0.4 | 0.25 | 0.4 | 0.4 | 0.25 | 0.4 | 0.4 |
| Blowing agent | | Water | 3.0 | 1.44 | 3.0 | 4.5 | 1.44 | 3.0 | 4.5 |
| Moldability | Foam stability | | ○ | ○ | ○ | ○ | ○ | ○ | ○ |
| | Cell state | | ○ | ○ | ○ | ○ | ○ | ○ | ○ |
| | Foam shrinkage | | ○ | ○ | ○ | ○ | ○ | ○ | ○ |
| Physical properties | Core density (kg/m$^3$) | | 29.2 | 58.9 | 28.2 | 20.1 | 59.7 | 27.7 | 22.3 |
| | Rebound resilience of core (%) | | 56 | 52 | 37 | 32 | 36 | 21 | 15 |
| | 25% ILD (N/314 cm$^2$) | | 83 | 165 | 137 | 100 | 393 | 239 | 221 |
| | Air flow (L/min.) | | 54.3 | 75.2 | 49.3 | 35.7 | 48.5 | 23.2 | 49.3 |
| | Tensile strength (kPa) | | 69 | 175 | 121 | 116 | 196 | 110 | 103 |
| | Elongation (%) | | 128 | 173 | 152 | 131 | 89 | 66 | 58 |
| | Dry set (%) | | 3.7 | 2.6 | 4.0 | 11.2 | 3.5 | 9.2 | 32.2 |
| | Wet set (%) | | 7.4 | 2.6 | 5.9 | 36.6 | 3.8 | 22.9 | 41.6 |
| | | Ex. | 21 | 22 | 23 | 24 | 25 | 26 | |
| Polyol composition (I) | Polyol Compound (A) | A1 | — | — | — | — | — | — | |
| | | A2 | — | — | — | — | — | — | |
| | | A3 | — | — | — | — | — | — | |
| | | A4 | — | — | — | — | — | — | |
| | | A5 | — | — | — | — | — | — | |
| | Polyol Compound (B) | B1-1 | — | — | 33 | 33 | 33 | 33 | |
| | | B1-2 | — | — | 41 | 41 | 41 | 41 | |
| | | B1-3 | 100 | 100 | 23.5 | 23.5 | 23.5 | 23.5 | |
| | | B1-4 | — | — | 12 | 12 | 12 | 12 | |
| | | B1-5 | — | — | — | — | — | — | |
| | Monool compound (X) | X1 | 7.5 | — | 7.5 | 7.5 | — | — | |
| | | X2 | — | 7.5 | — | — | 7.5 | 7.5 | |
| Polyisocyanate composition (II) Isocyanate index | | I1 | 100 | 100 | 100 | 100 | 100 | 100 | |
| Urethane-forming catalyst | Metal catalyst | M1 | — | — | 0.1 | — | 0.1 | — | |
| | | M2 | 0.8 | 0.8 | — | 0.2 | — | 0.2 | |
| | Amine catalyst | N1 | 0.25 | 0.25 | 0.25 | 0.25 | 0.25 | 0.25 | |
| Blowing agent | | Water | 1.44 | 1.44 | 1.44 | 1.44 | 1.44 | 1.44 | |
| Moldability | Foam stability | | ○ | ○ | ○ | ○ | ○ | ○ | |
| | Cell state | | ○ | ○ | ○ | ○ | ○ | ○ | |
| | Foam shrinkage | | ○ | ○ | ○ | ○ | ○ | ○ | |
| Physical properties | Core density (kg/m$^3$) | | 59.7 | 60.0 | 61.5 | 68.2 | 54.7 | 69.9 | |
| | Rebound resilience of core (%) | | 62 | 60 | 20 | 15 | 14 | 24 | |
| | 25% ILD (N/314 cm$^2$) | | 99 | 109 | 82 | 99 | 51 | 134 | |
| | Air flow (L/min.) | | 129.8 | 97.0 | 14.3 | 6.2 | 12.8 | 1.1 | |
| | Tensile strength (kPa) | | 68 | 68 | 53 | 66 | 49 | 76 | |

TABLE 2-continued

| | | | | | | |
|---|---|---|---|---|---|---|
| Elongation (%) | 143 | 138 | 172 | 153 | 206 | 136 |
| Dry set (%) | 2.4 | 1.3 | 2.5 | 1.4 | 5.8 | 0.7 |
| Wet set (%) | 2.5 | 1.8 | 1.3 | 0.6 | 2.6 | 0.7 |

Comparative Examples 1 and 2

A flexible polyurethane foam was produced in the same manner as in Example 1 except that compositions of used raw materials were changed as shown in Table 3.

Comparative Example 3

A flexible polyurethane foam was produced in the same manner as in Example 1 except that compositions of used raw materials were changed as shown in Table 3, and a wooden box having 250 mm in length and width and 250 mm in height was used.

Comparative Examples 4 and 5

A flexible polyurethane foam was produced in the same manner as in Example 1 except that a polyol system containing the silicone foam stabilizer S1 was used as shown in Table 3.

Settling means a phenomenon that the molded foam reaches the highest height and then sinks, and the settling rate was calculated by the following formula.

Settling rate (%)=$[(A-B)/A]\times 100$

Here, in the formula, A represents the foam highest height (mm) and B represents the height (mm) when the foam sinks.
(Cell State)

Cell state was evaluated in accordance with the following standard.

○: No cell coarsening observed in foam, and fine cell obtained.

Δ: Cell coarsening observed in a part of foam.

X: Cell coarsening observed all around foam.
(Foam Shrinkage)

The flexible polyurethane foam was taken out from the wooden box and left to stand for 24 hours in a room adjusted to have room temperature of 23° C. and a humidity of 50%, and then, the foam shrinkage was evaluated visually based on the following standard.

TABLE 3

| | Comp. Ex. | | 1 | 2 | 3 | 4 | 5 |
|---|---|---|---|---|---|---|---|
| Polyol composition (I) | Polyol Compound (A) | A3 | — | — | — | 100 | 100 |
| | Polyol Compound (B) | B1-3 | 100 | 100 | — | — | — |
| | | B1-5 | — | — | 100 | — | — |
| | Monool compound (Y) | Y1 | 7.5 | — | — | — | — |
| Polyisocyanate composition (II) Isocyanate index | | I1 | 100 | 100 | 100 | 100 | 100 |
| Urethane-forming catalyst | Metal catalyst | M1 | — | — | — | 0.5 | 0.5 |
| | | M2 | 0.8 | 0.8 | 0.4 | — | — |
| | Amine catalyst | N1 | 0.25 | 0.25 | 0.25 | 0.25 | 0.25 |
| Silicone foam stabilizer | | S1 | — | — | — | 1.0 | 0.5 |
| Blowing agent | | Water | 1.44 | 1.44 | 1.44 | 1.44 | 1.44 |
| Moldability | Foam stability | | X | X | X | ○ | ○ |
| | Cell state | | | | | ○ | ○ |
| | Foam shrinkage | | X | X | | ○ | ○ |
| Physical properties | Core density (kg/m$^3$) | | | | | 55.0 | 59.3 |
| | Rebound resilience of core (%) | | | | | 54 | 51 |
| | 25% ILD (N/314 cm$^2$) | | | | | 104 | 112 |
| | Air flow (L/min.) | | | | | 57.2 | 100.0 |
| | Tensile strength (kPa) | | | | | 63 | 61 |
| | Elongation (%) | | | | | 110 | 139 |
| | Dry set (%) | | | | | 2.0 | 2.1 |
| | Wet set (%) | | | | | 2.3 | 1.9 |

[Evaluation Method]

The measurement and evaluation methods relating to the moldability of the flexible polyurethane foam obtained in Examples 1 to 26 and Comparative Examples 1 to 5, are shown as follows.
(Foam Stability)

Foam stability was evaluated based on the following standard.

○: Foam molded, and no settling visually observed.

Δ: Foam molded, and settling rate of at least 5% but foam shape maintained.

X: State such that foam collapsed or mixed liquid seemed as if boiling.

○: No shrinkage observed in foam, and state immediately after foaming maintained.

Δ: Shrinkage observed in a part of foam.

X: Shrinkage observed all around foam.

Further, the measurement of the physical properties of the produced flexible polyurethane foam is described below.
(Core Density, Rebound Resilience of Core)

The core density and the rebound resilience of the core were measured by a method in accordance with JIS K6400 (1997 edition). A sample obtained by removing the skin portion from the center portion of the foam, followed by cutting into a size of 100 mm in length and width and 50 mm in height, was used for the measurement.
(25% Hardness, Air Flow, Tensile Strength, Elongation, Dry Set and Wet Set)

The 25% hardness (ILD), air flow, tensile strength, elongation, dry set and wet set were measured by methods in accordance with JIS K6400 (1997 edition). Further, the air flow was measured by a method in accordance with method B of JIS K6400 (1997 edition).

Here, the measurements of the 25% hardness, air flow and rebound resilience of the core, were carried out after crushing by a hand.

With respect to Examples 8 and 9, and Comparative Examples 4 and 5, silicone components were detected by the following method.

[Analysis of Silicone Component]
(Extract of Silicone Component)

The obtained flexible polyurethane foam (5 g) was put into a 200 mL container made of glass, and 100 mL of tetrahydrofuran was added thereto. The flexible polyurethane foam in a state immersed in tetrahydrofuran was subjected to an ultrasonic treatment for 30 minutes by using an ultrasonic vibrator, followed by stirring for 10 minutes by a tube mixer. The flexible polyurethane foam was taken out from the container made of glass, and nitrogen gas was sprayed from above for 8 hours to evaporate remaining tetrahydrofuran.

Then, 2 mL of tetrahydrofuran was added again to prepare an extract.

(Detection of Silicone Component)

The silicone component from the obtained extract was detected by gas chromatography (model "GC-14B", manufactured by Shimadzu Corporation). The extract was heated for 5 minutes at 150° C., and then, heated to 250° C. over a period of 10 minutes, and the temperature was kept thereafter to the completion of the measurement (about 75 minutes from the beginning). The gas generated from the extract was analyzed by gas chromatography to detect the silicone components. The method has a limit of detection of the silicone component of 100 ppm.

A confirmation method for the detection of the silicone component is as follows. The gas generated from the silicone foam stabilizer S1 used in Example 9 was analyzed by gas chromatography to confirm the peak of the silicone component. Then, the peak was compared with the one of the extract obtained in Examples 8 and 9, and Comparative Examples 4 and 5 to confirm the detection of the silicone component. The results are shown in Table 4.

TABLE 4

|  | Ex. 8 | Ex. 9 | Comp. Ex. 4 | Comp. Ex. 5 |
| --- | --- | --- | --- | --- |
| Detection of silicone component | No | No | Yes | Yes |

As shown in Tables 1 and 2, in the combination use type wherein a polyol compound contained in the polyol composition (I) is both the polyol compound (A) and the polyol compound (B), it was possible to produce a flexible polyurethane foam in an open system without using a silicone foam stabilizer (Examples 1 to 4). Further, in the polyol alone type wherein a polyol compound contained in the polyol composition (I) is only the polyol compound (A), it was also possible to produce a flexible polyurethane foam in an open system without using a silicone foam stabilizer (Examples 5 to 8 and 10 to 20). Further, in a case where the polyol composition (I) does not contain the polyol compound (A), by using the monool compound (X), it was also possible to produce a flexible polyurethane foam in an open system without using a silicone foam stabilizer (Examples 21 to 26).

Further, with respect to the flexible polyurethane foam of the present invention produced without using a silicone foam stabilizer in Example 8, and the flexible polyurethane foam having an amount of a silicone foam stabilizer of 0.2 mass % (silicon content of 0.03 mass %) to the polyol composition (I) (100 mass %) in Example 9, no silicone component was detected by the analysis by gas chromatography.

On the other hand, as shown in Table 3, in the case of the polyol composition (I) containing neither the polyol compound (A) nor the monool compound (X), the foam stability was low, foam shrinkage was observed, and it was not possible to produce a flexible polyurethane foam in an open system without using a silicone foam stabilizer (Comparative Examples 1 to 3).

Further, in Comparative Examples 4 and 5, the polyol composition (I) containing the polyol (A) was used and a flexible polyurethane foam was produced, however, a silicone component was detected by gas chromatography.

INDUSTRIAL APPLICABILITY

The flexible polyurethane foam obtained by the production process of the present invention can be obtained substantially without using a silicone foam stabilizer, and therefore, it does not contain a volatile organic compound (VOC) and it has little possibility to cause e.g. generation of an odor or drawbacks of electronic components. Further, since the unit price for the production of the silicone foam stabilizer tends to be low, the foam can be suitably used for a wide range of applications such as beddings, mattresses or cushions.

The entire disclosure of Japanese Patent Application No. 2007-241372 filed on Sep. 18, 2007 including specification, claims, and summary is incorporated herein by reference in its entirety.

What is claimed is:

1. A process for producing a flexible polyurethane foam, which comprises reacting a polyol composition (I) comprising at least a polyol compound and a polyisocyanate composition (II) comprising a polyisocyanate compound in the presence of a urethane-forming catalyst and a blowing agent, in an open system substantially without using a silicone foam stabilizer, wherein the urethane-forming catalyst is made of a metal catalyst and an amine catalyst, and the polyol composition (I) comprises, as the only polyol compound, a polyol compound (A) obtained by ring-opening polymerization of an alkylene oxide with an initiator by using a double metal cyanide complex catalyst and/or a monool compound (X) obtained by ring-opening polymerization of an alkylene oxide with an initiator by using a double metal cyanide complex catalyst, wherein polyol compound (A) has an average number of hydroxyl groups of 3, the amine catalyst is present in an amount of 0.1 to 1.5 parts, per 100 parts by mass of polyol composition (I), and the metal catalyst is present in an amount of 0.3 to 0.8 part, per 100 parts by mass of polyol composition (I).

2. The process for producing a flexible polyurethane foam according to claim 1, wherein the polyol compound (A) is present and is a polyether polyol obtained by ring-opening polymerization of an alkylene oxide with an initiator by using a double metal cyanide complex catalyst, and having a hydroxy value of from 10 to 90 mgKOH/g.

3. The process for producing a flexible polyurethane foam according to claim 1, wherein the monool compound (X) is present and is a polyether monool obtained by ring-opening polymerization of an alkylene oxide with an initiator by using a double metal cyanide complex catalyst, and having a hydroxy value of from 5 to 200 mgKOH/g.

4. The process for producing a flexible polyurethane foam according to claim 1, wherein the polyol compound (A) is present and has an unsaturation value of at most 0.05 meq/g.

5. The process for producing a flexible polyurethane foam according to claim 1, wherein the polyol compound (A) is present and is a polymer-dispersed polyol.

6. The process for producing a flexible polyurethane foam according to claim 1, wherein the polyol compound (A) is present and is a polyol obtained by ring-opening polymerization by using only propylene oxide as the alkylene oxide.

7. The process for producing a flexible polyurethane foam according to claim 1, wherein the polyol compound (A) is present and is a polyol obtained by ring-opening polymerization by using propylene oxide and ethylene oxide in combination as the alkylene oxide.

8. The process for producing a flexible polyurethane foam according to claim 1, wherein the monool compound (X) is present and is a monool obtained by ring-opening polymerization by using only propylene oxide as the alkylene oxide.

9. The process for producing a flexible polyurethane foam according to claim 1, wherein the monool compound (X) is present and is a monool obtained by ring-opening polymerization by using propylene oxide and ethylene oxide in combination as the alkylene oxide.

10. The process for producing a flexible polyurethane foam according to claim 1, wherein only water is used as the blowing agent.

11. The process for producing a flexible polyurethane foam according to claim 1, wherein the isocyanate index is from 90 to 130.

12. The process for producing a flexible polyurethane foam according to claim 1, wherein the silicone foam stabilizer is present in an amount of at most 0.03 mass %, based on 100 mass % of polyol composition (I).

13. The process for producing a flexible polyurethane foam according to claim 1, wherein no silicone foam stabilizer is present.

14. The process for producing a flexible polyurethane foam according to claim 1, wherein the polyisocyanate compound is tolylene diisocyanate.

* * * * *